(12) United States Patent
Yang

(10) Patent No.: US 8,908,405 B2
(45) Date of Patent: Dec. 9, 2014

(54) SNUBBER CIRCUIT AND INVERTER WITH THE SAME

(75) Inventor: Jianning Yang, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 211 days.

(21) Appl. No.: 13/524,464

(22) Filed: Jun. 15, 2012

(65) Prior Publication Data

US 2012/0320643 A1    Dec. 20, 2012

(30) Foreign Application Priority Data

Jun. 15, 2011  (CN) .......................... 2011 1 0161126
Jun. 14, 2012  (CN) .......................... 2012 1 0195790

(51) Int. Cl.
| | |
|---|---|
| *H02M 7/5387* | (2007.01) |
| *H02M 7/537* | (2006.01) |
| *H02M 7/44* | (2006.01) |
| *H02M 3/24* | (2006.01) |
| *H02M 7/487* | (2007.01) |
| *H02M 1/34* | (2007.01) |

(52) U.S. Cl.
CPC ............ *H02M 7/487* (2013.01); *Y02B 70/1491* (2013.01); *H02M 2001/346* (2013.01); *H02M 2001/348* (2013.01); *H02M 1/34* (2013.01)
USPC ..................... 363/132; 363/56.01; 363/56.12; 363/98; 363/131

(58) Field of Classification Search
CPC ................................ H02M 1/34; H02M 7/487
USPC .............. 363/37, 56.01–56.02, 56.12, 58, 61, 363/95–98, 131–132
See application file for complete search history.

(56) References Cited

U.S. PATENT DOCUMENTS 4,855,893 A * 8/1989 Kratz ............................. 363/136
5,383,108 A * 1/1995 Okayama ...................... 363/137

(Continued)

FOREIGN PATENT DOCUMENTS

| CN | 1173068 A | 2/1998 |
|---|---|---|
| CN | 1276927 A | 12/2000 |
| JP | H07213076 A | 8/1995 |
| JP | H07312872 A | 11/1995 |

OTHER PUBLICATIONS

First Chinese Office Action regarding Application No. 201210195790.4, dated Sep. 23, 2014. Translation provided by Unitalen Attorneys at Law.

*Primary Examiner* — Timothy J Dole
*Assistant Examiner* — Yusef Ahmed
(74) *Attorney, Agent, or Firm* — Harness, Dickey & Pierce, P.L.C.

(57) ABSTRACT

An inverter may include an inversion unit for converting a direct current bus voltage into an alternating current voltage, a first snubber unit, and a second snubber unit. The inversion unit may include a first external switch, a first internal switch, a second internal switch, and a second external switch which are connected in series in order between a direct current bus positive voltage terminal and a direct current bus negative voltage terminal. The first snubber unit may be connected between the direct current bus negative voltage terminal and the first internal switch for suppressing voltage stress of the first internal switch. The second snubber unit may be connected between the direct current bus positive voltage terminal and the second internal switch for suppressing voltage stress of the second internal switch.

11 Claims, 12 Drawing Sheets

(56) References Cited

U.S. PATENT DOCUMENTS

| | | | |
|---|---|---|---|
| 5,621,634 A * | 4/1997 | Sato | 363/98 |
| 5,841,645 A * | 11/1998 | Sato | 363/43 |
| 5,892,675 A * | 4/1999 | Yatsu et al. | 363/136 |
| 5,910,892 A * | 6/1999 | Lyons et al. | 363/98 |
| 5,953,222 A * | 9/1999 | Mizutani | 363/56.05 |
| 6,058,031 A * | 5/2000 | Lyons et al. | 363/67 |
| 6,084,788 A * | 7/2000 | Mizutani | 363/56.12 |
| 6,137,703 A * | 10/2000 | Julian et al. | 363/127 |
| 6,226,192 B1 * | 5/2001 | Yamanaka et al. | 363/56.01 |
| 6,307,760 B1 * | 10/2001 | Ikimi | 363/39 |
| 6,392,907 B1 * | 5/2002 | Ichikawa | 363/98 |
| 6,838,925 B1 * | 1/2005 | Nielsen | 327/391 |
| 7,746,041 B2 * | 6/2010 | Xu et al. | 323/223 |
| 8,471,584 B2 * | 6/2013 | Soldi et al. | 324/762.01 |
| 8,559,193 B2 * | 10/2013 | Mazumder | 363/8 |
| 2003/0026118 A1 * | 2/2003 | Ikimi et al. | 363/132 |
| 2003/0206423 A1 * | 11/2003 | Ikimi et al. | 363/58 |
| 2010/0156354 A1 * | 6/2010 | Nielsen | 320/137 |
| 2011/0127837 A1 * | 6/2011 | Sato et al. | 307/66 |
| 2011/0280055 A1 * | 11/2011 | Nielsen | 363/131 |
| 2012/0257430 A1 * | 10/2012 | Truettner | 363/131 |
| 2012/0294056 A1 * | 11/2012 | Temesi et al. | 363/131 |

* cited by examiner

SNUBBER CIRCUIT AND INVERTER WITH THE SAME

CROSS-REFERENCE TO RELATED APPLICATIONS

This application claims the benefits and priorities of Chinese Application No. 201110161126.3, filed on Jun. 15, 2011 and Chinese Application No. 201210195790.4, filed on Jun. 14, 2012. The entire disclosures of the above applications are incorporated herein by reference.

FIELD

The present disclosure relates to inverter technology, and in particular to a snubber circuit and an inverter with the same.

BACKGROUND

This section provides background information related to the present disclosure which is not necessarily prior art.

An inverter is a device used to convert direct current into alternating current. For an inverter such as a NPC (Neutral Point Clamped) three-level inverter, an excessive high voltage stress of an internal switch is one of the factors which may impair the safe operation of the inverter. To remove such factor, the inverter may be provided with a snubber circuit. When the snubber circuit needs an external power supply which is electrically isolated from a main circuit, the volume and weight of the inverter will be increased, and the control for the inverter is made relatively complicated.

SUMMARY

This section provides a general summary of the present disclosure, and is not a comprehensive disclosure of its full scope or all of its features.

Some embodiments of the present disclosure provide a snubber circuit and an inverter with the same capable of suppressing voltage stress of an internal switch in the inverter effectively without any external power supply which is electrically isolated from the main circuit.

An inverter may include an inversion unit for converting a direct current bus voltage into an alternating current voltage, a first snubber unit, and a second snubber unit. The inversion unit may include a first external switch, a first internal switch, a second internal switch, and a second external switch which are connected in series in order between a direct current bus positive voltage terminal and a direct current bus negative voltage terminal. The first snubber unit may be connected between the direct current bus negative voltage terminal and the first internal switch for suppressing voltage stress of the first internal switch. The second snubber unit may be connected between the direct current bus positive voltage terminal and the second internal switch for suppressing voltage stress of the second internal switch.

A snubber circuit for an inverter may include a first snubber unit and a second snubber unit. The first snubber unit may be connected between a direct current bus negative voltage terminal and a first internal switch in the inverter for suppressing voltage stress of the first internal switch. The second snubber unit may be connected between a direct current bus positive voltage terminal and a second internal switch in the inverter for suppressing voltage stress of the second internal switch.

The snubber circuit and the inverter with the same according to the present disclosure may be connected directly to the direct current bus positive voltage terminal and the direct current bus negative voltage terminal without any external power supply which is electrically isolated from the main circuit. The volume and weight of the inverter may be reduced, and the control for the inverter is made relatively simple.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Figure 1:
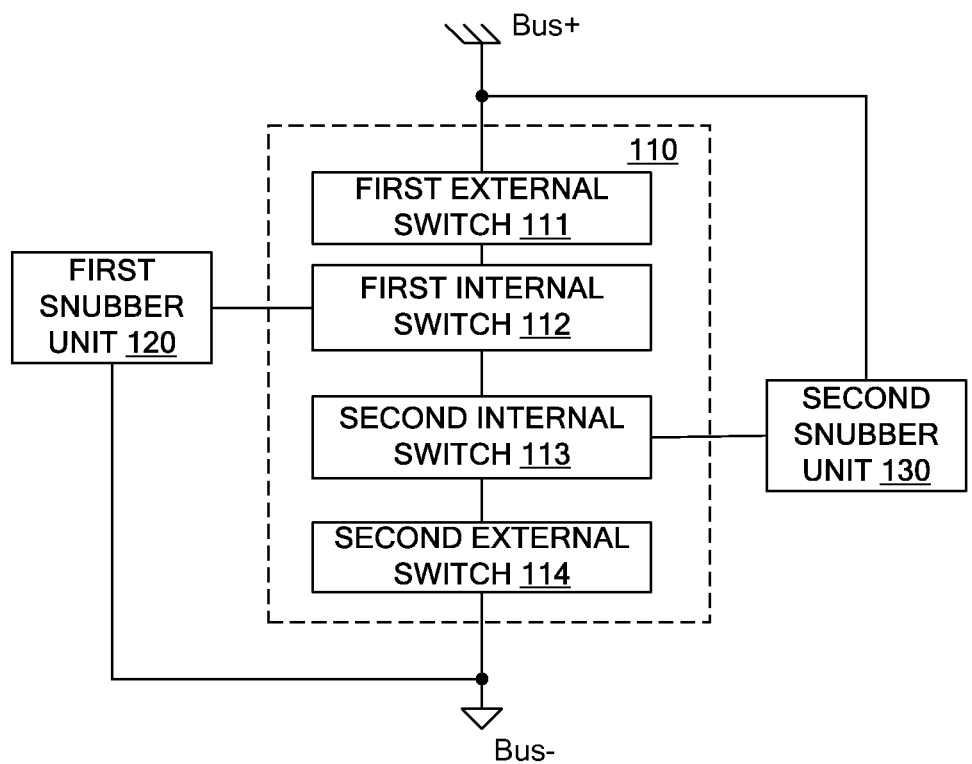
FIG. 1 is a block diagram of an illustrative structure of an inverter according to the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DESCRIPTION OF EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As shown in FIG. 1, an inverter 100 according to a specific embodiment of the disclosure may include an inversion unit 110, a first snubber unit 120, and a second snubber unit 130. The inversion unit 110 is used to convert a direct current bus voltage into an alternating current voltage. Herein, The inversion unit 110 may include a first external switch 111, a first internal switch 112, a second internal switch 113, and a second external switch 114 which are connected in series in order between a direct current bus positive voltage terminal "Bus+" and a direct current bus negative voltage terminal "Bus−". The first snubber unit 120 may be connected between the direct current bus negative voltage terminal "Bus−" and the first internal switch 112 for suppressing voltage stress of the first internal switch 112. The second snubber unit 130 may be connected between the direct current bus positive voltage terminal "Bus+" and the second internal switch 113 for suppressing voltage stress of the second internal switch 113.

In the inverter 100 as shown in FIG. 1, the first snubber unit 120 and the second snubber unit 130 suppress the voltage stresses of the first internal switch 112 and the second internal switch 113 by means of a direct current bus negative voltage source and a direct current bus positive voltage source, respectively, without any external power supply which is electrically isolated from the main circuit. Thus, the volume and weight of the inverter 100 may be reduced. Additionally, since there is no an external power supply in the inverter, the control for the inverter may be made relatively simple.

The present teachings are suitable for incorporation in many different types of inverters. For exemplary purposes, descriptions are made below, taking a NPC (Neutral Point Clamped) three-level inverter as an example.

There is a neutral point clamping a voltage of which is half of a direct current bus voltage in the topology structure of three-level inversion. The NPC three-level inverter adopts a three-level technology to output a three-level voltage, causing corresponding current thereof to be more similar to an effect of a sine wave and thus improving the efficiency of the inverter.

Figure 2:
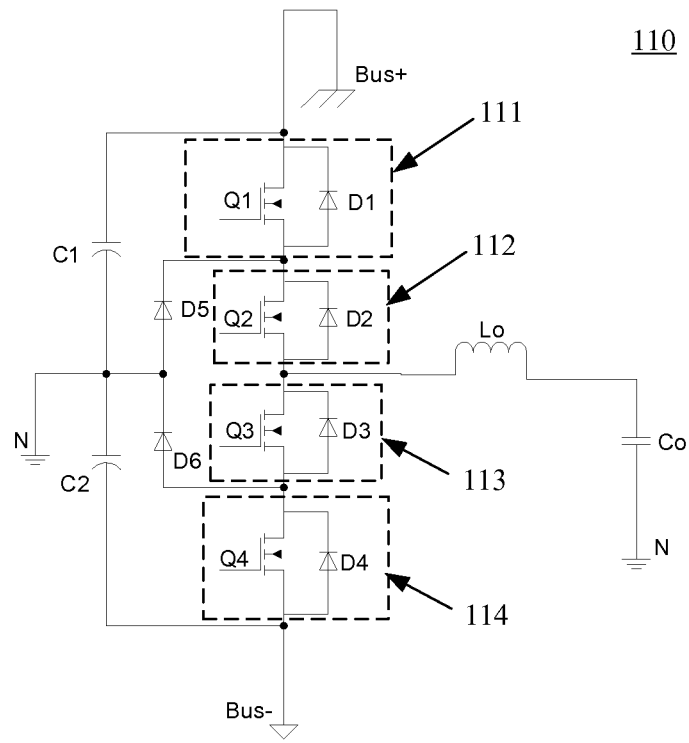
FIG. 2 is a circuit structural diagram of an inversion unit in an inverter.

As shown in FIG. 2, the first internal switch 112, the second internal switch 113, the first external switch 111, and the second external switch 114 included in the inversion unit 110 in the NPC three-level inverter each may adopt a MOSFET (Metal-Oxide-Semiconductor Field-Effect Transistor) device. The disclosure is not particularly limited thereto. For example, the first internal switch 112, the second internal switch 113, the first external switch 111, and the second external switch 114 each may also adopt an IGBT (Insulated Gate Bipolar Transistor) device.

As can be seen from FIG. 2, the first internal switch 112, the second internal switch 113, the first external switch 111, and the second external switch 114 may each consist of a MOSFET device and a diode, and the cathode and anode of the diode are connected to the source and drain of the MOSFET device, respectively. When the IGBT device is adopted, the gate of the MOSFET device corresponds to the gate of the IGBT device, the source of the MOSFET device corresponds to the collector of the IGBT device, and the drain of the MOSFET device corresponds to the emitter of the IGBT device. That is, when the IGBT device is adopted, the cathode and anode of the diode may be connected to the collector and emitter of the IGBT device, respectively.

In general, the MOSFET or IGBT device available from the market itself may be provided with a diode connected between the source and drain or the collector and emitter as described above. In such case, the first internal switch 112, the second internal switch 113, the first external switch 111, and the second external switch 114 may adopt only the MOSFET or IGBT device without additional diode. On the other hand, if the MOSFET or IGBT device itself is not provided with a diode connected between the source and drain or the collector and emitter as described above, an additional diode should be added.

Particularly, as shown in FIG. 2, the first external switch 111 may include a MOSFET device Q1 and a diode D1. The second external switch 114 may include a MOSFET device Q4 and a diode D4. The first internal switch 112 may include a MOSFET device Q2 and a diode D2. The second internal switch 113 may include a MOSFET device Q3 and a diode D3.

A source of the MOSFET device Q1 may be connected to the direct current bus positive voltage terminal "Bus+", and a drain thereof may be connected to a source of the MOSFET device Q2. A drain of the MOSFET device Q2 may be connected to a source of the MOSFET device Q3. A drain of the MOSFET device Q3 is connected to a source of the MOSFET device Q4. An drain of the MOSFET device Q4 may be connected to the direct current bus negative voltage terminal Bus−.

A node connected between the first internal switch 112 and the second internal switch 113 may be connected to a neutral line N via an inductor Lo and a capacitor Co.

Two diodes D5 and D6 may, after being connected in series, be connected in parallel with a branch formed by connecting the first internal switch 112 and the second internal switch 113 in series, and a node connected between the two diodes D5 and D6 may be connected to the neutral line N.

Two capacitors C1 and C2 may, after being connected in series, be connected in parallel with a branch formed by connecting the first external switch 111, the first internal switch 112, the second internal switch 113, and the second external switch 114 in series, and a node connected between the two capacitors C1 and C2 may be connected to the neutral line N.

The inversion unit 110 with the structure as described above may be used to invert the direct current bus voltage between the direct current bus positive voltage terminal "Bus+" and the direct current bus negative voltage terminal "Bus−", and output through the inductor Lo and the capacitor Co to obtain an alternating current approximating a sine wave.

Figure 3:
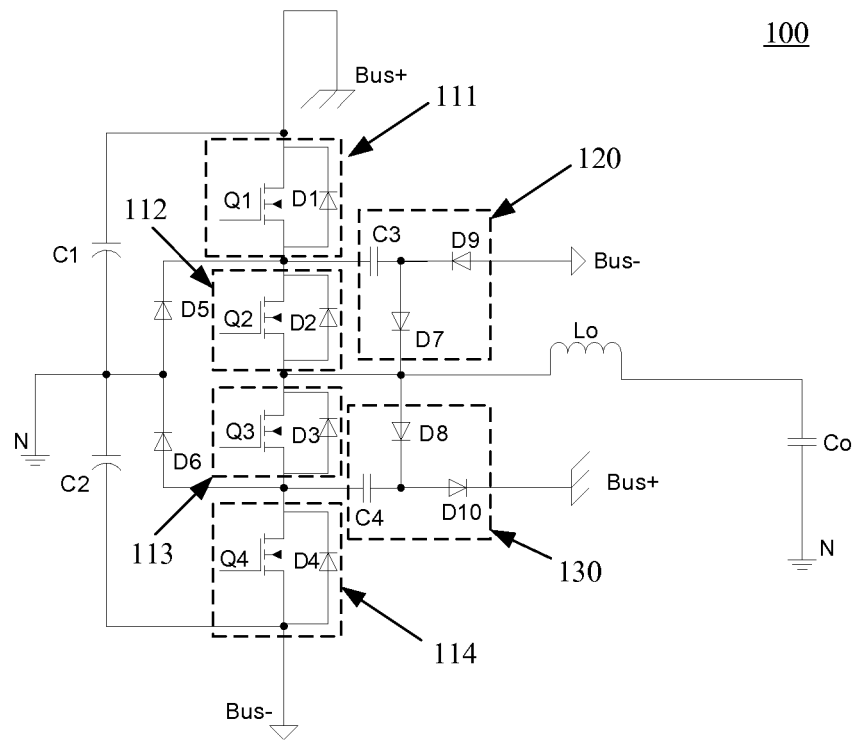
FIG. 3 is a circuit structural diagram of an inverter with a snubber circuit according to an embodiment of the present disclosure.

As shown in FIG. 3, the inverter 100 according to the disclosure may further include the first snubber unit 120 for suppressing the voltage stress of the first internal switch 112 and the second snubber unit 130 for suppressing the voltage stress of the second internal switch 113. The first snubber unit 120 and the second snubber unit 130 constitute a snubber circuit for the inverter according to the disclosure.

The first snubber unit 120 may include a first snubber branch and a first discharge unit. The first snubber branch may be connected in parallel with the first internal switch 112 for suppressing the voltage stress of the first internal switch 112. The first discharge unit may be connected between the first snubber branch and the direct current bus negative voltage terminal "Bus−" for discharging of the first snubber branch.

The second snubber unit 130 may include a second snubber branch and a second discharge unit. The second snubber branch may be connected in parallel with the second internal switch 113 for suppressing the voltage stress of the second internal switch 113. The second discharge unit may be connected between the second snubber branch and the direct current bus positive voltage terminal "Bus+" for discharging of the second snubber branch.

An operation principle of the first snubber unit 120 and the second snubber unit 130 will be described in detail later.

Particularly, as shown in FIG. 3, the first snubber branch may include a capacitor C3 as a first snubber capacitor and a diode D7 as a first snubber diode connected in series. The first discharge unit may include a diode D9 as a first discharge diode. The diode D9 may be connected between a node connected between the capacitor C3 and the diode D7 and the direct current bus negative voltage terminal "Bus−". Herein, a terminal of the capacitor C3 may be connected with an anode of the diode D7, and the direct current bus negative voltage terminal Bus− may be connected with an anode of the diode D9.

According to the embodiment of the disclosure, the diode D7 with low parasitic inductance is adopted as a snubber diode, and the capacitor C3 is adopted as a snubber capacitor. The diode D7 and the capacitor C3 are connected in series, and then connected in parallel with the first internal switch 112 for suppressing the voltage stress of the first internal switch 112. The diode D9 is connected between the anode of the diode D7 and the direct current bus negative voltage terminal "Bus−" for forming a discharge circuit for the capacitor C3.

The second snubber branch may include a capacitor C4 as a second snubber capacitor and a diode D8 as a second snubber diode connected in series. The second discharge unit may include a diode D10 as a second discharge diode. The diode D10 may be connected between a node connected between the capacitor C4 and the diode D8 and the direct current bus positive voltage terminal "Bus+". Herein, a terminal of the capacitor C4 may be connected with a cathode of the diode D8, and the direct current bus positive voltage terminal "Bus+" may be connected with a cathode of the diode D10.

According to the embodiment of the disclosure, the diode D8 with low parasitic inductance may also be adopted as a snubber diode, and the capacitor C4 is adopted as a snubber capacitor. The diode D8 and the capacitor C4 are connected in series, and then connected in parallel with the second internal switch 113 for suppressing the voltage stress of the second internal switch 113. The diode D10 is connected between the cathode of the diode D8 and the direct current bus positive voltage terminal "Bus+" to form a discharge circuit for the capacitor C4.

The snubber circuit according to the embodiment of the disclosure includes snubber branches provided for respective internal switches 112 and 113. Thus, when one of the internal switches 112 and 113 is turned off, a low impedance path is provided through the snubber branch, thereby reducing the voltage stresses of the internal switches 112 and 113.

The snubber circuit and the inverter with the same according to the disclosure are capable of suppressing the voltage stress of the internal switch in the inverter effectively. Since the snubber circuit and the inverter with the same according to the disclosure directly employs the direct current bus positive voltage source and the direct current bus negative voltage source without any external power supply which is electrically isolated from the main circuit, the volume and weight of the inverter may be reduced, and control may be made relatively simple.

Taking the NPC three-level inverter as an example, an operation principle of the inverter according to the embodiment of the disclosure will be described in detail with reference to the drawings below.

Figure 4:
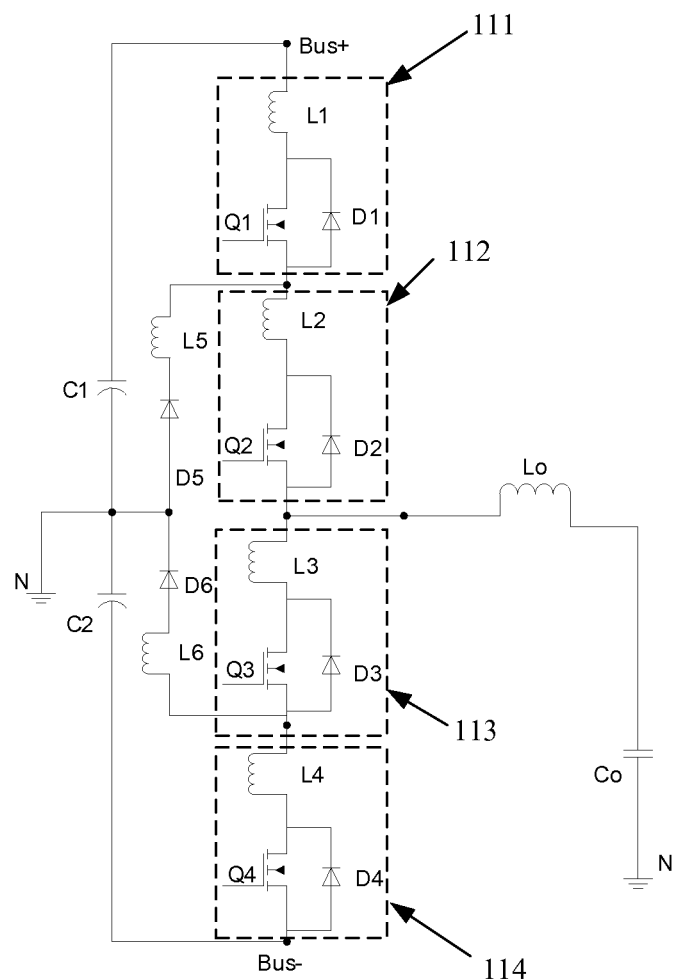
FIG. 4 is an equivalent circuit structural diagram of the inverter as shown in FIG. 2 after parasitic inductance is taken into consideration.

Taking the parasitic inductance into consideration, an equivalent circuit of the inverter without snubber circuit illustrated in FIG. 2 is illustrated in FIG. 4.

Herein, an inductor L1 connected in series to the first external switch 111 represents parasitic inductance of the first external switch 111, an inductor L2 connected in series to the first internal switch 112 represents parasitic inductance of the first internal switch 112, an inductor L3 connected in series to the second internal switch 113 represents parasitic inductance of the second internal switch 113, and an inductor L4 connected in series to the second external switch 114 represents parasitic inductance of the second external switch 114. Additionally, an inductor L5 connected in series to the diode D5 represents parasitic inductance of the diode D5, and an inductor L6 connected in series to the diode D6 represents parasitic inductance of the diode D6.

Figure 5A:
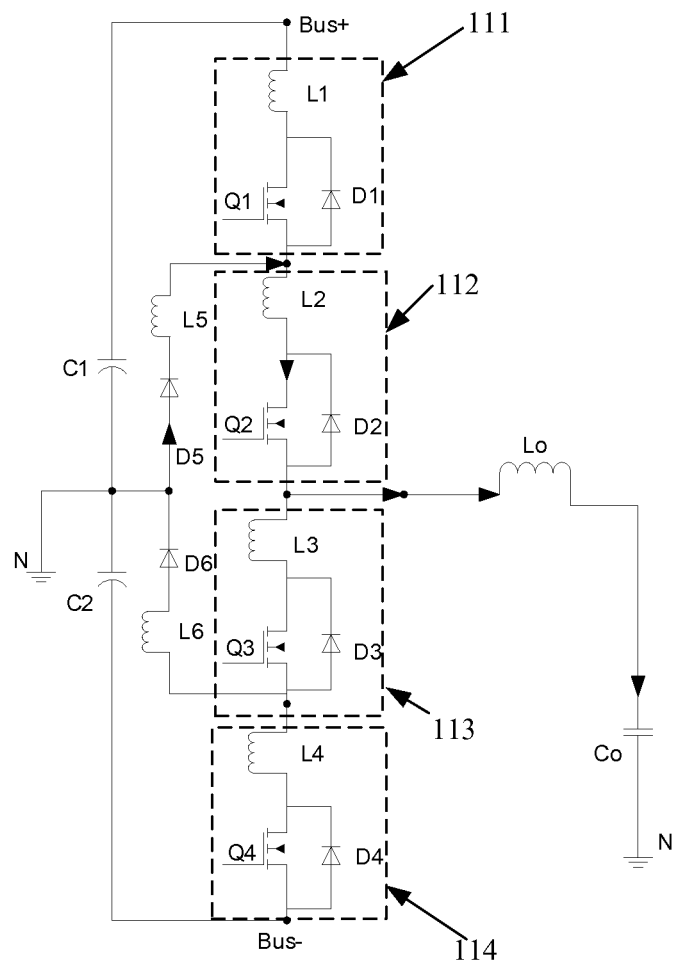
FIG. 5a is a schematic diagram of a current direction of the inverter as shown in FIG. 2 in a first mode.
Figure 5B:
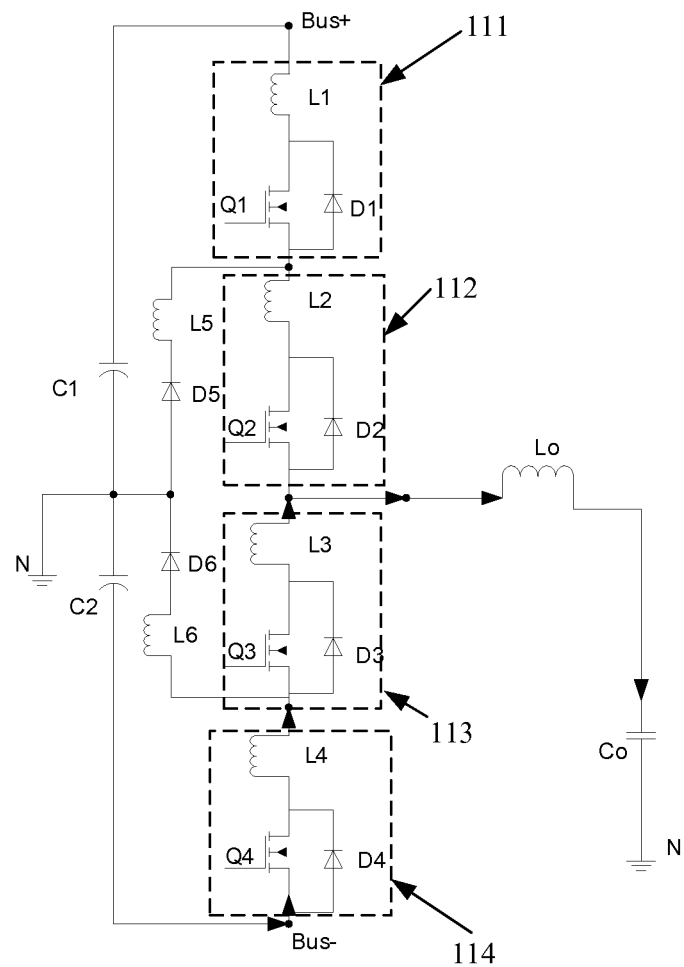
FIG. 5b is a schematic diagram of a current direction of the inverter as shown in FIG. 2 in a second mode.

The inverter illustrated in FIG. 4 has no snubber circuit. A current direction in a first mode for this inverter is as illustrated in FIG. 5a. The current will flow in order through the neutral line N, the diode D5, the inductor L5, the inductor L2, the MOSFET device Q2, the inductor Lo, the capacitor Co, and the neutral line N. When the MOSFET device Q2 of the first internal switch 112 is turned off, this inverter is in a second mode. At this time, since the current on the inductor Lo can not be mutated, the current direction is as illustrated in FIG. 5b. The current will flow in order through the neutral line N, the capacitor C2, the diode D4, the inductor L4, the diode D3, the inductor L3, the inductor Lo, the capacitor Co, and the neutral line N.

As can be known from the analysis above, when the MOSFET device Q2 of the first internal switch 112 is switched between a turn-on state and a turn-off state, the path of the current is switched between two branches. It is assumed that a rate of change in the current is di/dt which depends on a switching speed of the MOSFET device.

As can be seen from FIG. 4, the voltage $V_{Bus}$ across the first capacitor C1 or the second capacitor C2 is constant, which may be expressed as follows:

$$V_{Bus} = \text{const} \quad (1)$$

Additionally, due to the existence of the parasitic inductance (the inductors L2-L5), the voltage $V_{Q2}$ across the MOSFET device Q2 is as follows:

$$V_{Q2} = V_{Bus} + (L2 + L3 + L4 + L5)\frac{di}{dt} \quad (2)$$

Here $$La = \sum_{i=2}^{5} Li.$$

As can be known from formula (2), the larger La is, the higher the voltage across the MOSFET device Q2 is.

Figure 6:
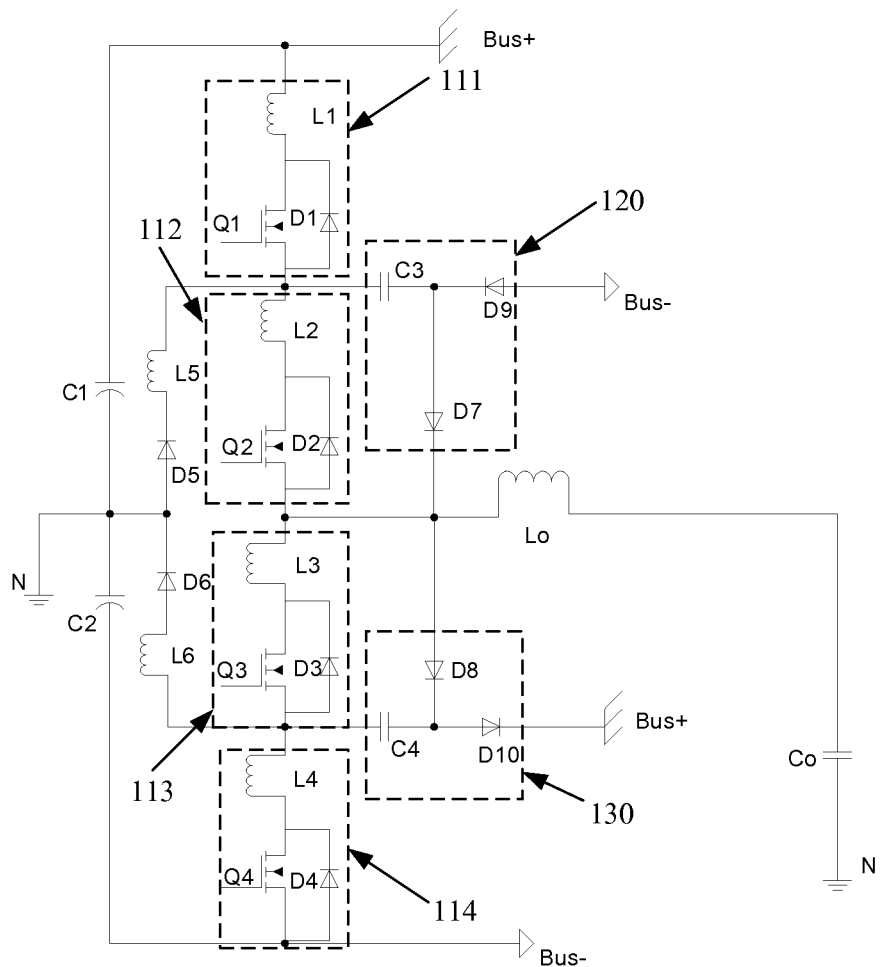
FIG. 6 is an equivalent circuit structural diagram of the inverter as shown in FIG. 3 after parasitic inductance is taken into consideration.
Figure 7A:
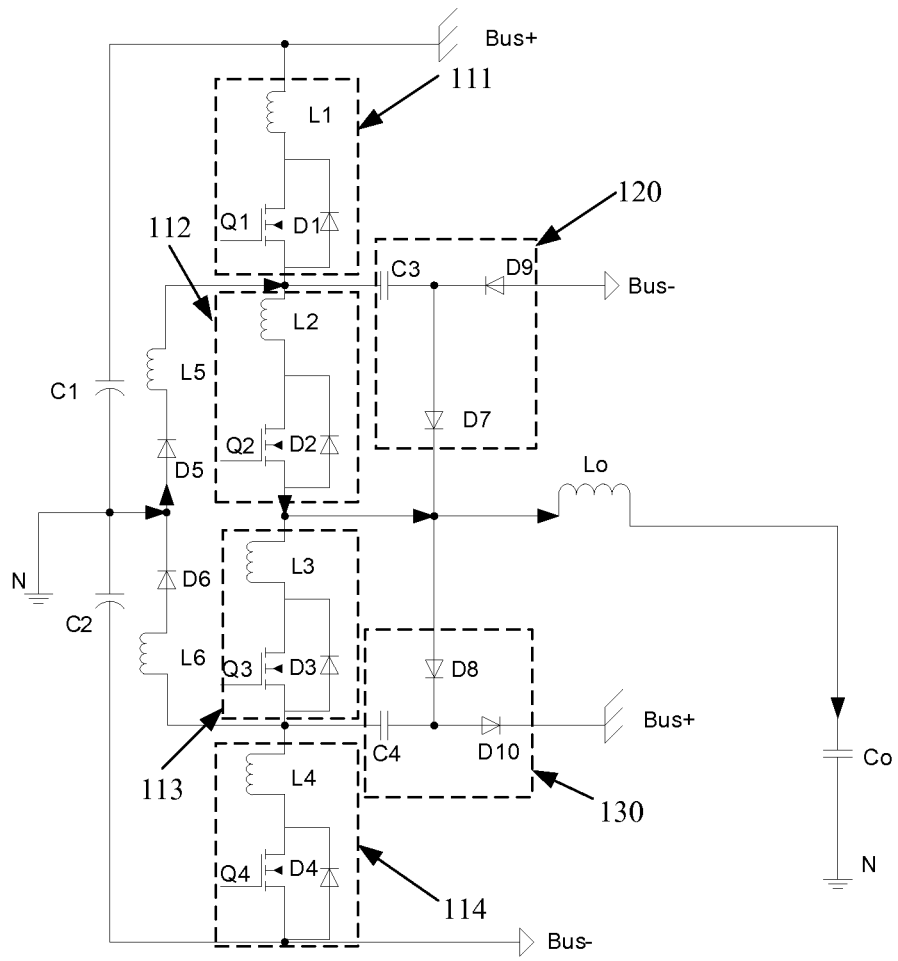
FIG. 7a is a schematic diagram of a current direction of the inverter as shown in FIG. 3 in a first mode.
Figure 7B:
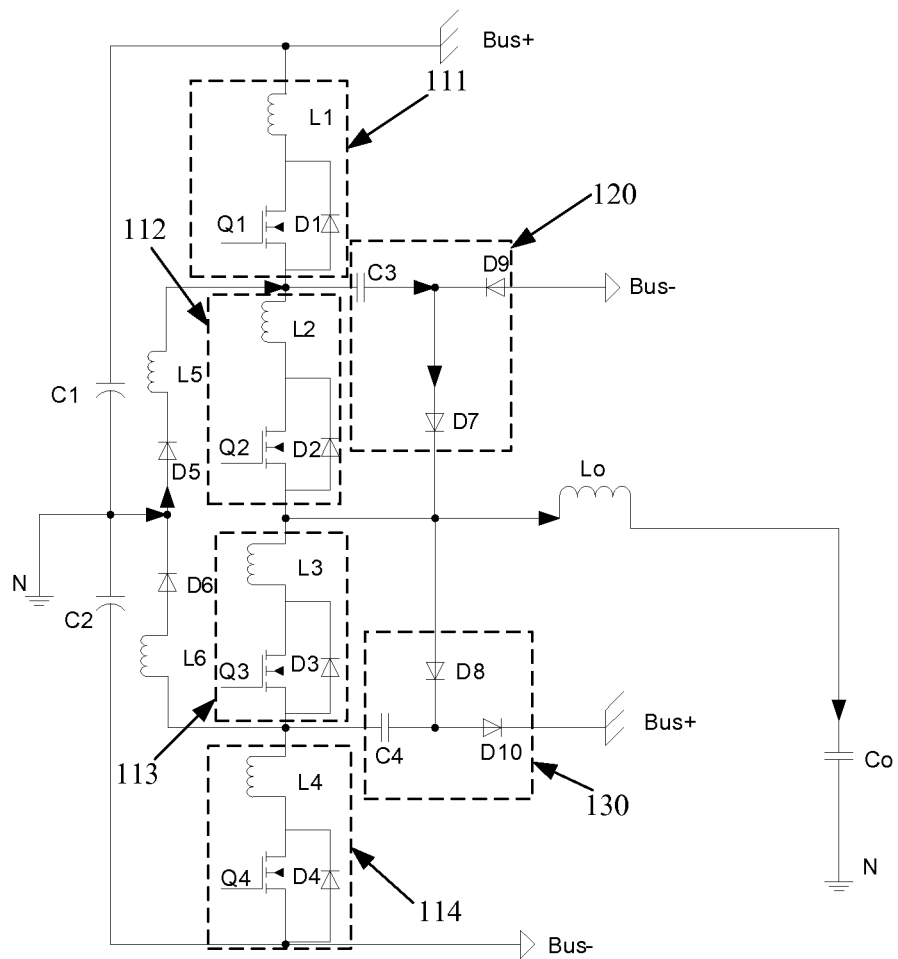
FIG. 7b is a schematic diagram of a current direction of the inverter as shown in FIG. 3 in a second mode.

FIG. 6 is an equivalent circuit structural diagram of the inverter with the snubber circuit as shown in FIG. 3 after parasitic inductance is taken into consideration. The current direction in a first mode for this inverter 100 is illustrated in FIG. 7a. The current will flow in order through the neutral line N, the diode D5, the inductor L5, the inductor L2, the MOSFET device Q2, the inductor Lo, the capacitor Co, and the neutral line N. When the MOSFET device Q2 of the first internal switch 112 is turned off, this inverter 100 is in a second mode. At this time, since the current on the inductor Lo can not change abruptly, the current direction is as illustrated in FIG. 7b. The current will flow in order through the neutral line N, the diode D5, the inductor L5, the capacitor C3, the diode D7, the inductor Lo, the capacitor Co, and the neutral line N. At this time, the voltage $V_{Q2}$ across the MOSFET device Q2 is as follows:

$$V_{Q2} = V_{Bus} + L2 \times \frac{di}{dt} \quad (3)$$

Here Lb=L2.

As can be known from formula (2) and formula (3), Lb is smaller than La. Accordingly, the voltage stress of the MOSFET device Q2 becomes smaller after the snubber circuit is added.

Figure 7C:
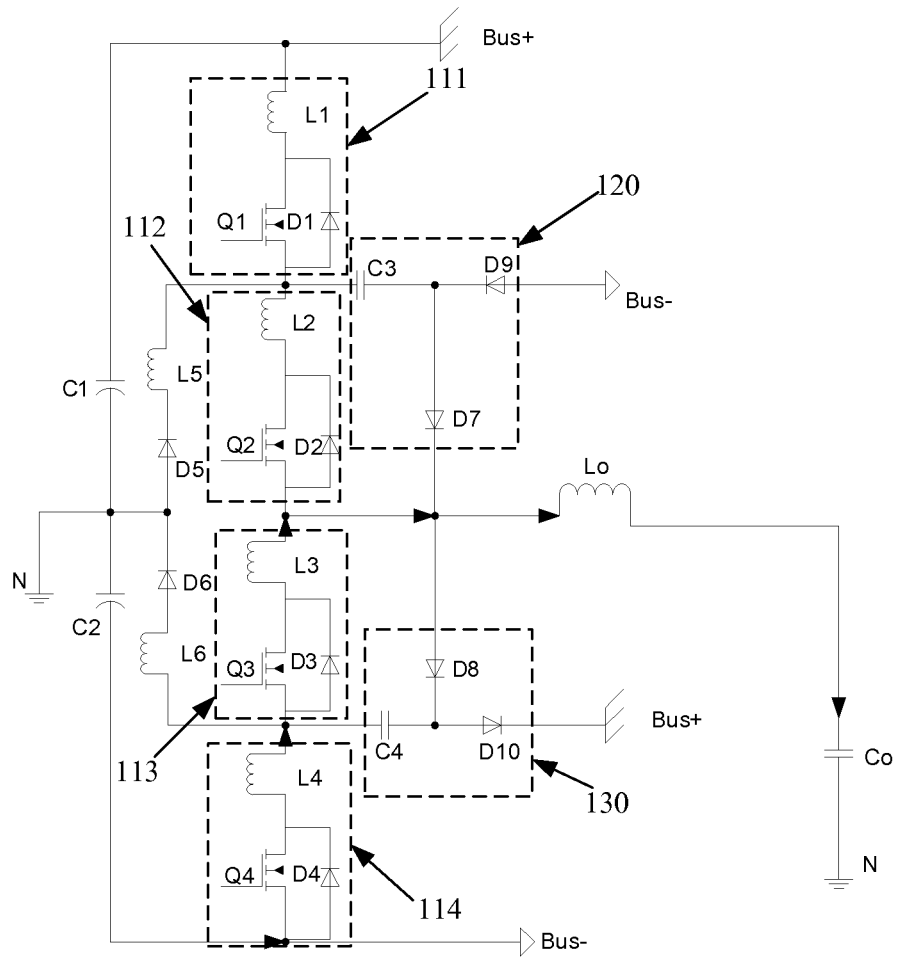
FIG. 7c is a schematic diagram of a current direction of the inverter as shown in FIG. 3 in a third mode.

When the snubber circuit exists, the capacitor C3 is charged continuously in the second mode of the inverter, such that the voltage thereof is larger than the bus voltage $V_{Bus}$. At this time, the diodes D3 and D4 begin to change the current gradually. At the beginning, the rate of change in the current di/dt is relatively small. Then, it is increased gradually until the current on the diodes D3 and D4 is equal to an inductance current. During this period, due to the existence of the capacitor C3, the voltage across the MOSFET device Q2 is always clamped to a relatively low level, and the inverter 100 is in a third mode. In the third mode, the current direction is as illustrated in FIG. 7c. The current will flow in order through the neutral line N, the diode D4, the inductor L4, the diode D3, the inductor L3, the inductor Lo, the capacitor Co, and the neutral line N.

Figure 7D:
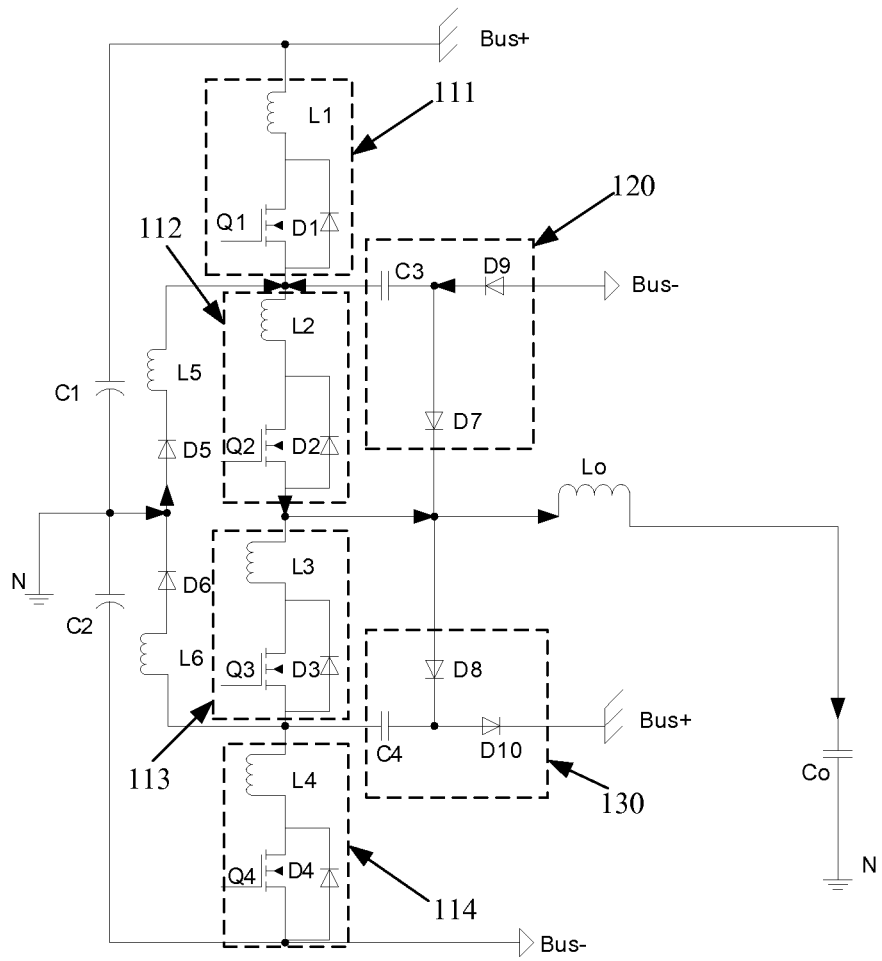
FIG. 7d is a schematic diagram of a current direction of the inverter as shown in FIG. 3 in a fourth mode.

Next time when the MOSFET device Q2 is turned on, the current is switched from the diodes D3 and D4 to the MOSFET device Q2. At this time, since the voltage across the capacitor C3 is larger than the bus voltage $V_{Bus}$, it is discharged through the diode D9 until the voltage across the capacitor C3 is equal to the bus voltage $V_{Bus}$, and the inverter 100 is in a fourth mode. In the fourth mode, the current direction is as illustrated in FIG. 7d. The current will flow in order through the neutral line N, the diode D5, the inductor L5, the inductor L2, the MOSFET device Q2, the inductor Lo, the capacitor Co, and the neutral line N. At the same time, the capacitor C3 is discharged through the diode D9.

As can be known from the analysis above, in the embodiment of the disclosure, the first snubber unit 120 is provided for the first internal switch 112 in the inverter 100. When the first internal switch 112 is turned off, a low impedance path is provided for the current on the inductor Lo through the first snubber unit 120, thereby reducing the voltage stress of the first internal switch 112.

In the analysis above the first internal switch 112 is taken as an example. The configuration and operation principle of the second snubber unit 130 for the second internal switch 113 is the same as that of the first snubber unit 120 for the first internal switch 112. When the second internal switch 112 is turned off, a low impedance path is provided for the current on the inductor Lo through the second snubber unit 130, thereby reducing the voltage stress of the second internal switch 113. The analysis for the second internal switch 113 will not be repeated herein.

Figure 8A:
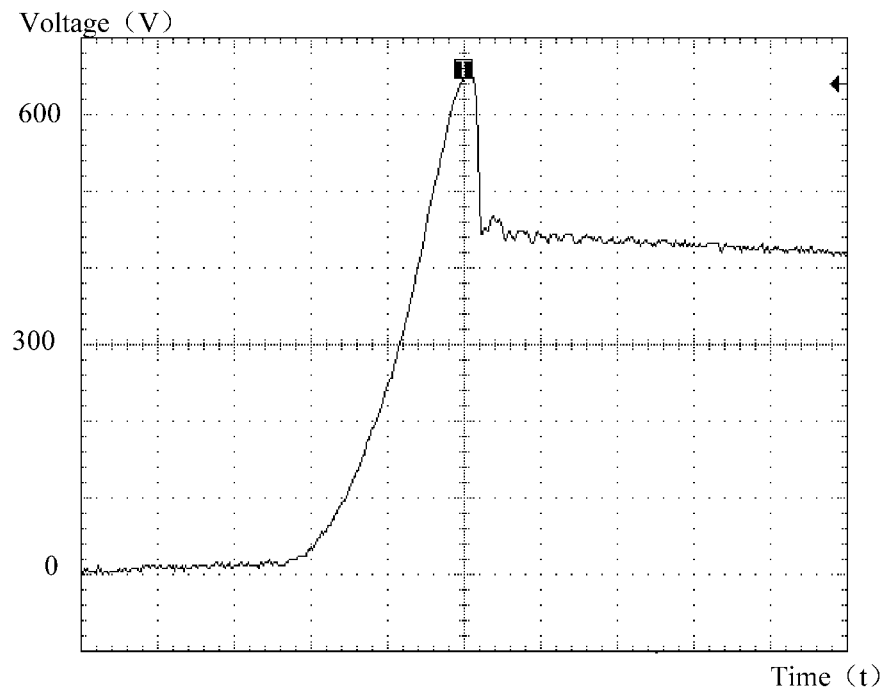
FIG. 8a is a waveform diagram of voltage of an internal switch in the inverter as shown in FIG. 2.
Figure 8B:
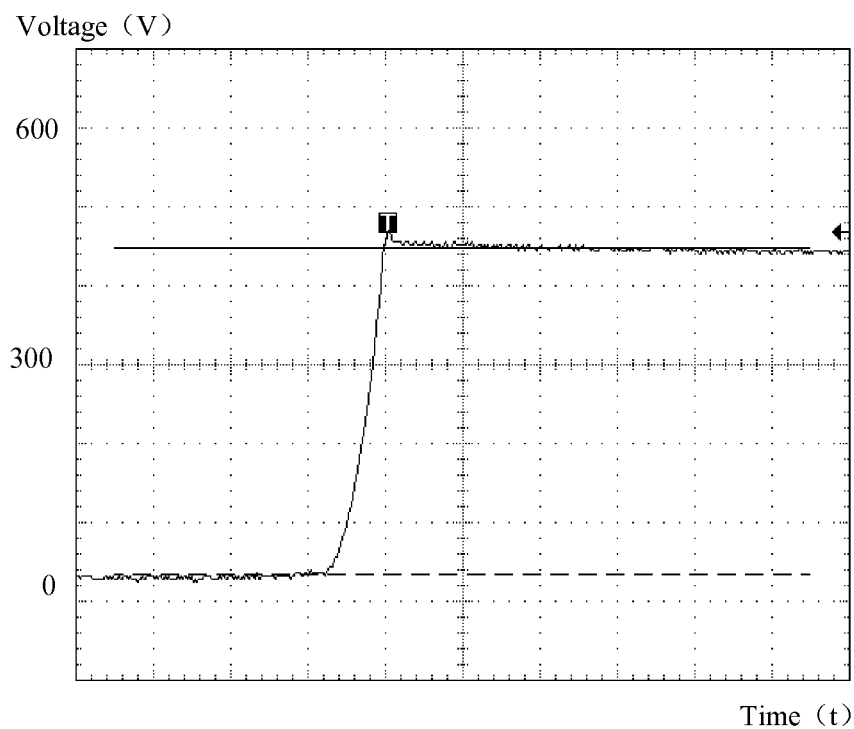
FIG. 8b is a waveform diagram of voltage of an internal switch in the inverter as shown in FIG. 3.

FIGS. 8a and 8b each are a waveform diagram illustrating the voltage across an internal switch in the inverter as shown in FIGS. 2 and 3, respectively. Herein, in the coordinate system illustrated in FIGS. 8a and 8b, the horizontal coordinate represents time, and the vertical coordinate represents a value of the voltage across an internal switch in the inverter. It is known from practical tests that a peak of the voltage stress of the internal switch in the inverter without the snubber circuit illustrated in FIG. 2 may reach up to 652 V (as shown in FIG. 8a), exceeding the rated voltage 600 V of the commonly used MOSFET device and resulting in overvoltage failure of the MOSFET device. As for the inverter with the snubber circuit illustrated in FIG. 3, a peak of the voltage stress on the MOSFET devices Q2 and Q3 may maintains at about 440 V (as shown in FIG. 8b). It can be known by comparing FIG. 8a with FIG. 8b that, after the snubber circuit is added, the voltage stress of the internal switch in the inverter is significantly reduced and is lower than the rated voltage of the MOSFET device. Thus, the inverter can operate normally.

Figure 9:
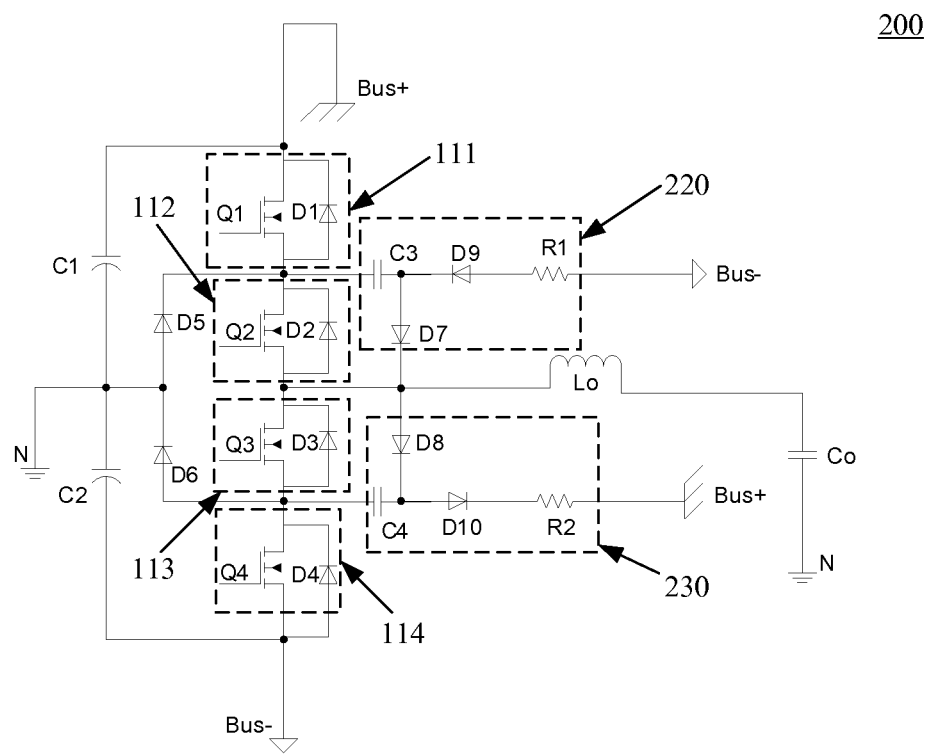
FIG. 9 is a circuit structural diagram of an inverter with a snubber circuit according to another embodiment of the present disclosure.

FIG. 9 is a circuit structural diagram of an inverter 200 with a snubber circuit according to another embodiment of the disclosure. The inverter 200 as shown in FIG. 9 is different from the inverter 100 as shown in FIG. 3 in that the first discharge unit further includes a resistor R1 as a first resistor and the second discharge unit further includes a resistor R2 as a second resistor.

The resistor R1 may be connected between the diode D9 and the direct current bus negative voltage terminal "Bus−", and the resistor R2 may be connected between the diode D10 and the direct current bus positive voltage terminal "Bus+".

Herein, a terminal of the capacitor C3 may be connected with the anode of the diode D7, and a terminal of the resistor R1 may be connected with the anode of the diode D9. Further, a terminal of the capacitor C4 may be connected with the cathode of the diode D8, and a terminal of the resistor R2 may be connected with the cathode of the diode D10.

By connecting a resistor in series to each of the diodes D9 and D10 in the discharge units, respectively, the current stress on the diodes D9 and D10 may be reduced effectively.

The particular embodiments disclosed above are illustrative only, as the disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosure.

What is claimed is:

1. An inverter comprising
an inversion unit for converting a direct current bus voltage into an alternating current voltage, the inversion unit including a first external switch, a first internal switch, a second internal switch, and a second external switch which are connected in series in order between a direct current bus positive voltage terminal and a direct current bus negative voltage terminal,
a first snubber unit connected between the direct current bus negative voltage terminal and the first internal switch, the first snubber unit being used for suppressing voltage stress of the first internal switch, and
a second snubber unit connected between the direct current bus positive voltage terminal and the second internal switch, the second snubber unit being used for suppressing voltage stress of the second internal switch,
wherein the first snubber unit includes a first snubber branch connected in parallel with the first internal switch and a first discharge unit connected between the first snubber branch and the direct current bus negative voltage terminal,
the second snubber unit includes a second snubber branch connected in parallel with the second internal switch and a second discharge unit connected between the second snubber branch and the direct current bus positive voltage terminal,
the first snubber branch includes a first snubber capacitor and a first snubber diode connected in series,
the second snubber branch includes a second snubber capacitor and a second snubber diode connected in series,
the first discharge unit includes a first discharge diode connected between a node connected between the first snubber capacitor and the first snubber diode and the direct current bus negative voltage terminal, and
the second discharge unit includes a second discharge diode connected between a node connected between the second snubber capacitor and the second snubber diode and the direct current bus positive voltage terminal.

2. The inverter according to claim 1, wherein
a terminal of the first snubber capacitor is connected with an anode of the first snubber diode,
the direct current bus negative voltage terminal is connected with an anode of the first discharge diode,
a terminal of the second snubber capacitor is connected with a cathode of the second snubber diode, and
the direct current bus positive voltage terminal is connected with a cathode of the second discharge diode.

3. The inverter according to claim 1, wherein
the first discharge unit further includes a first resistor connected between the first discharge diode and the direct current bus negative voltage terminal, and
the second discharge unit further includes a second resistor connected between the second discharge diode and the direct current bus positive voltage terminal.

4. The inverter according to claim 3, wherein
a terminal of the first snubber capacitor is connected with an anode of the first snubber diode,
a terminal of the first resistor is connected with an anode of the first discharge diode,
a terminal of the second snubber capacitor is connected with a cathode of the second snubber diode, and
a terminal of the second resistor is connected with a cathode of the second discharge diode.

5. The inverter according to claim 1, wherein
a node connected between the first internal switch and the second internal switch is connected to a neutral line via an inductor and a capacitor,
two diodes, after being connected in series, are connected in parallel with a branch formed by connecting the first internal switch and the second internal switch in series, and a node connected between the two diodes is connected to the neutral line, and
two capacitors, after being connected in series, are connected in parallel with a branch formed by connecting the first external switch, the first internal switch, the second internal switch, and the second external switch in series, and a node connected between the two capacitors is connected to the neutral line.

6. The inverter according to claim 5, wherein the first internal switch, the second internal switch, the first external switch, and the second external switch each adopt a MOSFET or IGBT device.

7. The inverter according to claim 5, wherein
the first internal switch, the second internal switch, the first external switch, and the second external switch each consist of a MOSFET or IGBT device and a diode, and
a cathode and anode of the diode are connected to a source and drain of the MOSFET device or a collector and emitter of the IGBT device, respectively.

8. A snubber circuit for an inverter comprising
a first snubber unit connected between a direct current bus negative voltage terminal and a first internal switch in the inverter, the first snubber unit being used for suppressing voltage stress of the first internal switch, and
a second snubber unit connected between a direct current bus positive voltage terminal and a second internal switch in the inverter, the second snubber unit being used for suppressing voltage stress of the second internal switch,
wherein the first snubber unit includes a first snubber branch connected in parallel with the first internal switch and a first discharge unit connected between the first snubber branch and the direct current bus negative voltage terminal,
the second snubber unit includes a second snubber branch connected in parallel with the second internal switch and a second discharge unit connected between the second snubber branch and the direct current bus positive voltage terminal,
the first snubber branch includes a first snubber capacitor and a first snubber diode connected in series,
the second snubber branch includes a second snubber capacitor and a second snubber diode connected in series,
the first discharge unit includes a first discharge diode connected between a node connected between the first snubber capacitor and the first snubber diode and the direct current bus negative voltage terminal, and
the second discharge unit includes a second discharge diode connected between a node connected between the second snubber capacitor and the second snubber diode and the direct current bus positive voltage terminal.

9. The snubber circuit according to claim 8, wherein a terminal of the first snubber capacitor is connected with an anode of the first snubber diode, the direct current bus negative voltage terminal is connected with an anode of the first discharge diode, a terminal of the second snubber capacitor is connected with a cathode of the second snubber diode, and the direct current bus positive voltage terminal is connected with a cathode of the second discharge diode.

10. The snubber circuit according to claim 8, wherein the first discharge unit further includes a first resistor connected between the first discharge diode and the direct current bus negative voltage terminal, and the second discharge unit further includes a second resistor connected between the second discharge diode and the direct current bus positive voltage terminal.

11. The snubber circuit according to claim 10, wherein a terminal of the first snubber capacitor is connected with an anode of the first snubber diode, a terminal of the first resistor is connected with an anode of the first discharge diode, a terminal of the second snubber capacitor is connected with a cathode of the second snubber diode, and a terminal of the second resistor is connected with a cathode of the second discharge diode.

* * * * *